United States Patent [19]

Yamaguchi

[11] Patent Number: 5,564,639
[45] Date of Patent: Oct. 15, 1996

[54] SLIDE MECHANISM FOR SPINNING REELS USED IN FISHING

[75] Inventor: Nobuyuki Yamaguchi, Tokyo, Japan

[73] Assignee: Daiwa Seiko, Inc., Tokyo, Japan

[21] Appl. No.: 249,351

[22] Filed: May 27, 1994

[30] Foreign Application Priority Data

May 27, 1993 [JP] Japan ................. 5-033240 U

[51] Int. Cl.$^6$ .................................. A01K 89/01
[52] U.S. Cl. .................................. 242/241
[58] Field of Search ........................ 242/241, 242

[56] References Cited

U.S. PATENT DOCUMENTS

| | | | |
|---|---|---|---|
| 4,266,739 | 5/1981 | Stiner | 242/241 |
| 4,491,285 | 1/1985 | Councilman | 242/242 |
| 4,927,094 | 5/1990 | Henriksson | 242/242 |
| 5,232,181 | 8/1993 | Fujine | 242/241 |

FOREIGN PATENT DOCUMENTS

| | | | |
|---|---|---|---|
| 4-1806 | 1/1992 | Japan . | |
| 5276856 | 10/1993 | Japan | 242/241 |
| 2246059 | 1/1992 | United Kingdom | 242/241 |

*Primary Examiner*—Katherine Matecki
*Attorney, Agent, or Firm*—Longacre & White

[57] ABSTRACT

The present disclosure concerns a device for spinning reels used in fishing. At a rear end portion of a spool shaft, there is formed a tip portion having a non-circular section and at least one peripheral groove. A corresponding non-circular through hole is formed in a slide member so as to receive the tip portion of the spool shaft. A traverse cam shaft passes through a circular hole in the slide member. A securing plate, formed out of sheet material which can be elastically deformed, includes at least one engaging opening engaging with the peripheral groove(s) and a securing portion retaining the securing plate on the slide member through elastic deformation. According to the present invention, it is possible to reduce the number of components in a fishing reel, as well as make it easier to assemble the reel.

12 Claims, 5 Drawing Sheets

SLIDE MECHANISM FOR SPINNING REELS USED IN FISHING

BACKGROUND OF THE INVENTION a) Field of the Invention

The invention relates to a spinning reel for fishing in which a slide member is connected to a spool shaft in a single operation.

Conventional structures for axially reciprocating a spool back and forth include a spool either frictionally or fixedly connected to a leading end portion of the spool shaft to be reciprocated. The spool shaft is moved back and forth by a slide mechanism linked with the rotation of a handle.

b) Description of Related Art

A connecting structure for connecting a reciprocal type of spool shaft with the slide mechanism is disclosed in Japanese Utility Model No. Hei. 4-1806. The rear end portion of the spool shaft is formed with a non-circular cross-section so as to non-rotatably engage a slide member of the slide mechanism. The spool shaft and slide member are subsequently fixed together by means of screws. However, in this conventional structure, use of the screws results in both an increased number of parts and requires an additional operation to tighten the screws. This makes it troublesome to assemble the conventional structure.

Two problems of conventional structures which are overcome by the present invention are the requirement for additional parts and the difficult assembly of those parts into the final structure.

SUMMARY OF THE INVENTION

Objectives of the present invention include providing a slide mechanism for spinning reels used in fishing which reduces the number of parts required, is readily incorporated into existing reel designs, and is easy to assemble.

In order to attain the above-noted and other objectives, the present invention provides an arrangement for a fishing reel in which a spool shaft is arranged to axially reciprocate upon rotation of a handle by connecting a rear end of the spool shaft with a slide member of a slide mechanism. The fishing reel equipped according to the present invention is characterized in that: a securing portion at the rear end of a spool shaft is non-rotatably engaged with a slide member; at least one peripheral groove is formed in the rear end of the spool shaft; and an engaging portion of a securing plate, which is elastically retained on the slide member, is engaged with the peripheral groove so as to prevent separation of the spool shaft from the slide member.

DESCRIPTION OF THE PREFERRED EMBODIMENT

Figure 7A:
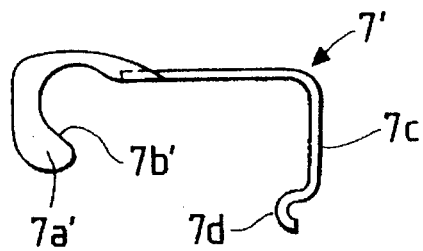
FIG. 7(a) is a side view, similar to FIG. 5(b), of a modified securing plate.
Figure 7B:
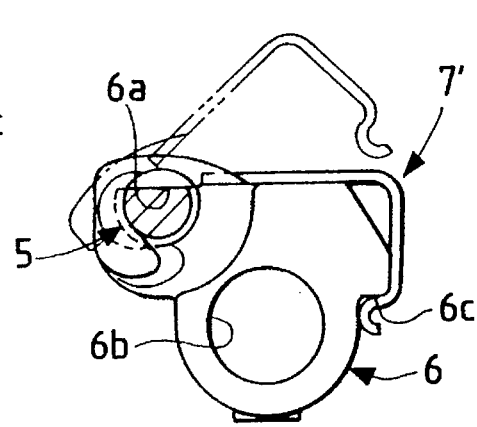
FIG. 7(b) is a front view, similar to FIG. 6(c), showing how the modified securing plate shown in FIG. 7 (a) interrelates with a slide member similar to that shown in FIGS. 6(a) and 6(b).
Figure 8:
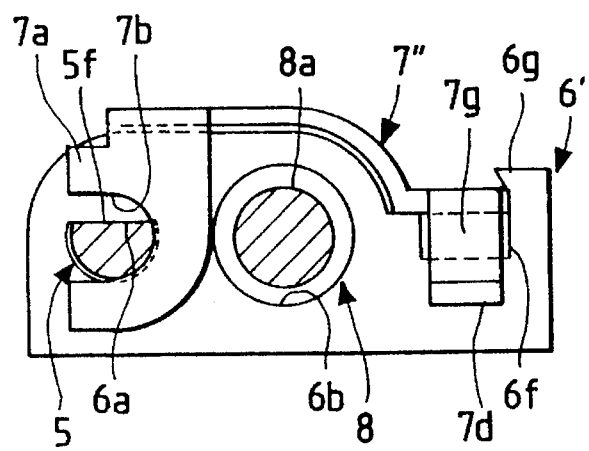
FIG. 8 is a front view showing how a securing plate according to a second embodiment of the present invention interrelates with a slide member according to the second embodiment.
Figure 9:
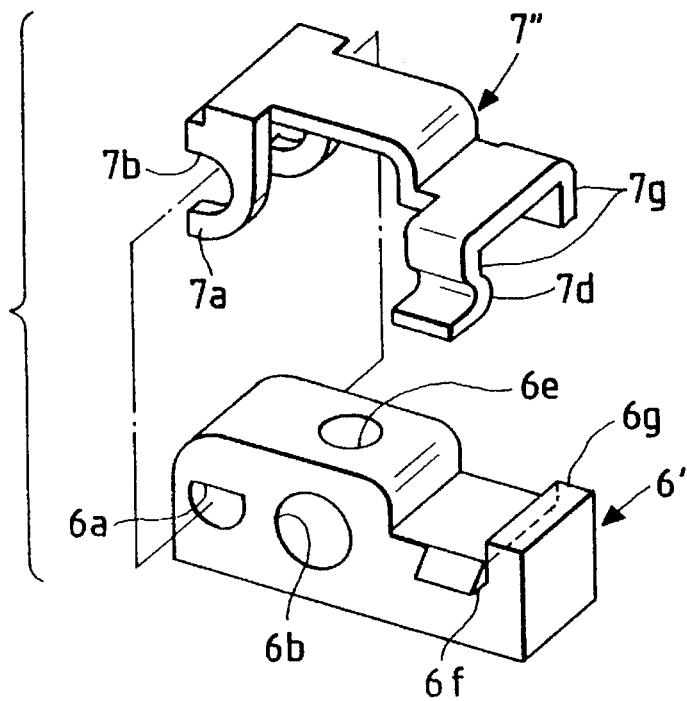
FIG. 9 is an exploded perspective view of the second embodiment shown in FIG. 8.
Figure 10:
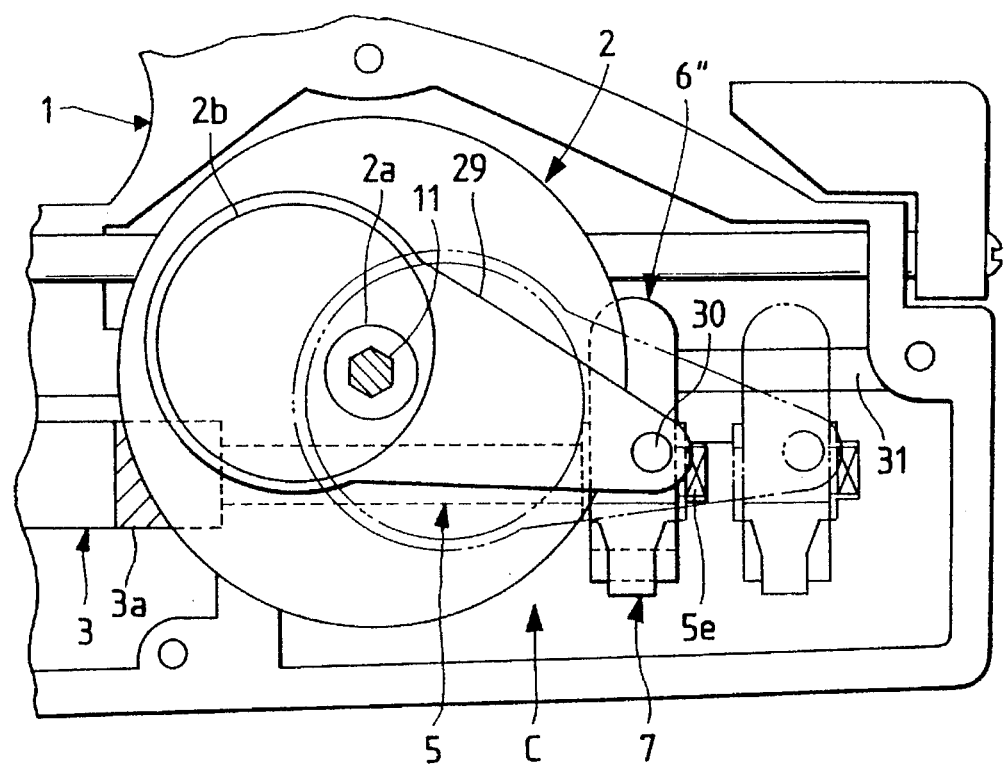
FIG. 10 is an enlarged sectional side view of the rear portion of a spinning reel for fishing incorporating a third embodiment of the present invention.
Figure 11:
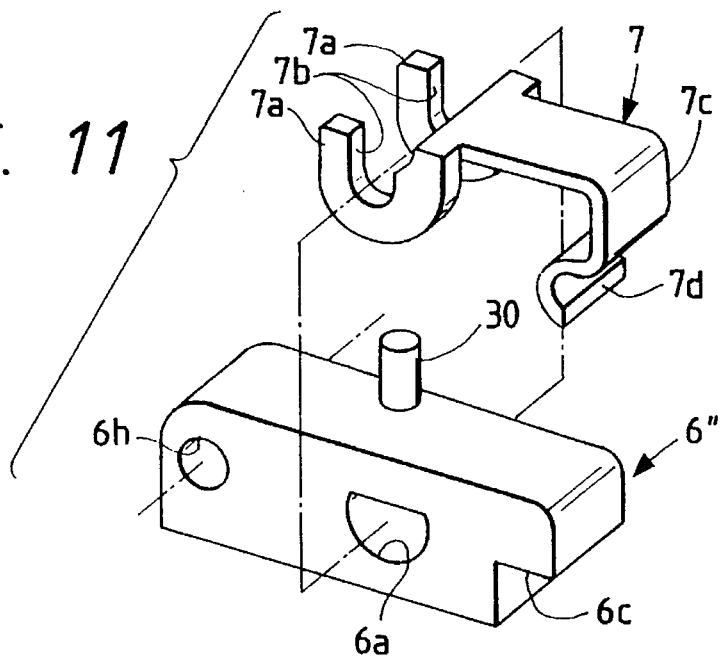
FIG. 11 is an exploded perspective view, similar to FIG. 9, of the third embodiment shown in FIG. 10.

The following description of the present invention refers to the embodiments shown in the accompanying drawings. FIGS. 1 to 6(c) show a first embodiment of the present invention. FIGS. 7(a) and 7(b) are directed to a modification of the first embodiment according to the present invention. FIGS. 8 and 9 show a second embodiment of the present invention, and FIGS. 10 and 11 show a third embodiment of the present invention.

In a spinning reel for fishing including the first embodiment according to the present invention, a rotary shaft 2a of a drive gear 2 is journaled in bearings (not shown) on the two lateral sides of a reel main body 1. A handle shaft 11 with a handle 10 fixed thereto is inserted and fitted into a central polygonal hole formed in the rotary shaft 2a in such a manner that the handle shaft 11 can be freely switched for right-handed or left-handed operation with respect to the reel main body 1.

In the front portion of the reel main body 1, there is disposed a rotary shaft cylinder 3 which is rotatably journaled by a bearing 12 and also projects forwardly therefrom.

A rotor 13 is fitted on the outer periphery of the rotary shaft cylinder 3 projecting forwardly of the bearing 12. The rotor 13 is fixed to the rotary shaft cylinder 3 by a nut 14.

Support for a base end portion of the rotary shaft cylinder 3 is derived from a bearing portion 1a of the reel main body 1. The drive gear 2 meshes with a pinion 3a at the base end portion of the rotary shaft cylinder 3 such that rotation of the handle 10 causes the rotor 13 to be rotated.

A spool shaft 5 with a spool 4 mounted on a leading end portion 5b of the spool shaft 5 is slidably inserted in a central hole formed in the rotary shaft cylinder 3 such that the spool shaft 5 can be axially reciprocated. A slide member 6 is secured to the rear end portion 5a of the spool shaft 5 by a securing plate 7.

Forward of the pinion 3a on the rotary shaft cylinder 3, within the reel main body 1, a linking gear 15 and a reversal prevention ratchet wheel 16 are non-rotatably fixed to the rotary shaft cylinder 3.

Within the reel main body 1, a traverse cam shaft 8 of a slide mechanism B is supported in parallel to the spool shaft 5 by the bearing portion 1a and a end plate 17 mounted at the rear of the reel main body 1.

A small gear 18 is non-rotatably fixed to a leading end portion of the traverse cam shaft 8, and is also in mesh with the linking gear 15.

The slide member 6 is fitted on the traverse cam shaft 8 and an engaging member claw 9a associated with the slide member 6 engages the traverse cam groove 8a.

The slide mechanism B is comprised of the slide member 6, the linking gear 15, the small gear 18, an engaging member 9 and the traverse cam shaft 8.

The spool 4 includes in the central portion thereof a through hole 4a through which a reduced diameter, leading end portion 5b of the spool shaft 5 extends. A recessed portion 4b in the spool 4 houses a drag device A comprising a brake plate 19, a brake plate 20 and a friction plate 21. A shaft cylinder portion 4c centrally disposed and extending toward a rear portion of the spool 4 is circumscribed by a winding barrel portion 4d round which a fishing line is to be wound.

Within the recessed portion 4b, there is formed at least one projection 4e with which the outer periphery of the brake plate 19 is engaged, and a depression 4f in which a brake plate removal prevention ring 22 is engaged.

A rotation prevention portion 5c is provided on the outer periphery of the reduced diameter, leading end portion 5b of the spool shaft 5, and a threaded portion 5d is formed at the tip of the reduced diameter, leading end portion 5b.

The brake plate 19, brake plate 20 and friction plate 21 are fitted around the outer periphery of the reduced diameter, leading end portion 5b of the spool shaft 5, and the brake plate 20 is prevented against rotation by the rotation prevention portion 5c.

During assembly, the spool 4 is fitted onto the reduced diameter, leading end portion 5b of the spool shaft 5 with a friction plate 23 and a brake plate 24 inserted between the reduced diameter, leading end portion 5b and the shaft cylinder portion 4c.

A pressure member 25 of the drag device A is non-rotatably, but slidably mounted on the outer periphery of the rotation prevention portion 5c of the reduced diameter, leading end portion 5b of the spool shaft 5. A spring 26 is radially interposed between the reduced diameter, leading end portion 5b and the pressure member 25.

A nut 28 secured to a knob 27 of the drag device A is in threaded engagement with the threaded portion 5d of the reduced diameter, leading end portion 5b of the spool shaft 5.

At the rear end portion 5a of the spool shaft 5, there is formed a tip portion 5e having a non-circular cross-section comprising a rotation prevention feature 5f and grooves 5g and 5h disposed toward the rear and front of the tip portion 5e, respectively.

The slide member 6 is formed with a non-circular through hole 6a into which the tip portion 5e is cooperatively received and a circular through hole 6b in which the traverse cam shaft 8 passes. The slide member 6 also includes a securing feature 6c disposed on a side surface parallel to the axes of the spool shaft 5 and traverse cam shaft 8. Indentations 6d, 6d, one on each axially facing end surface of the slide member 6, each accommodate one of a pair of support portions 7a, 7a of the securing plate 7. A blind hole 6e extending into the slide member 6 communicates with the circular through hole 6b and receives the engaging member 9.

The securing plate 7 which is formed out of sheet material that can be elastically deformed, includes the pair of support portions 7a, 7a. One engaging opening 7b, 7b is formed in each of the support portions 7a, 7a. An elastic portion 7c is disposed opposite to the support portions 7a, 7a with a securing portion 7d depending therefrom for engaging the securing feature 6c formed on the slide member 6.

Between the support portions 7a, 7a and the elastic portion 7c, the securing plate 7 includes a small through hole 7e into which a pin 9b of the engaging member 9 is pivotally received.

The slide member 6 is mounted on the spool shaft 5 by inserting the tip portion 5e of the spool shaft 5 having rotation prevention feature 5f into the non-circular through hole 6a of the slide member 6, and the traverse cam shaft 8 is received in the circular through hole 6b of the slider member 6.

Figure 1:
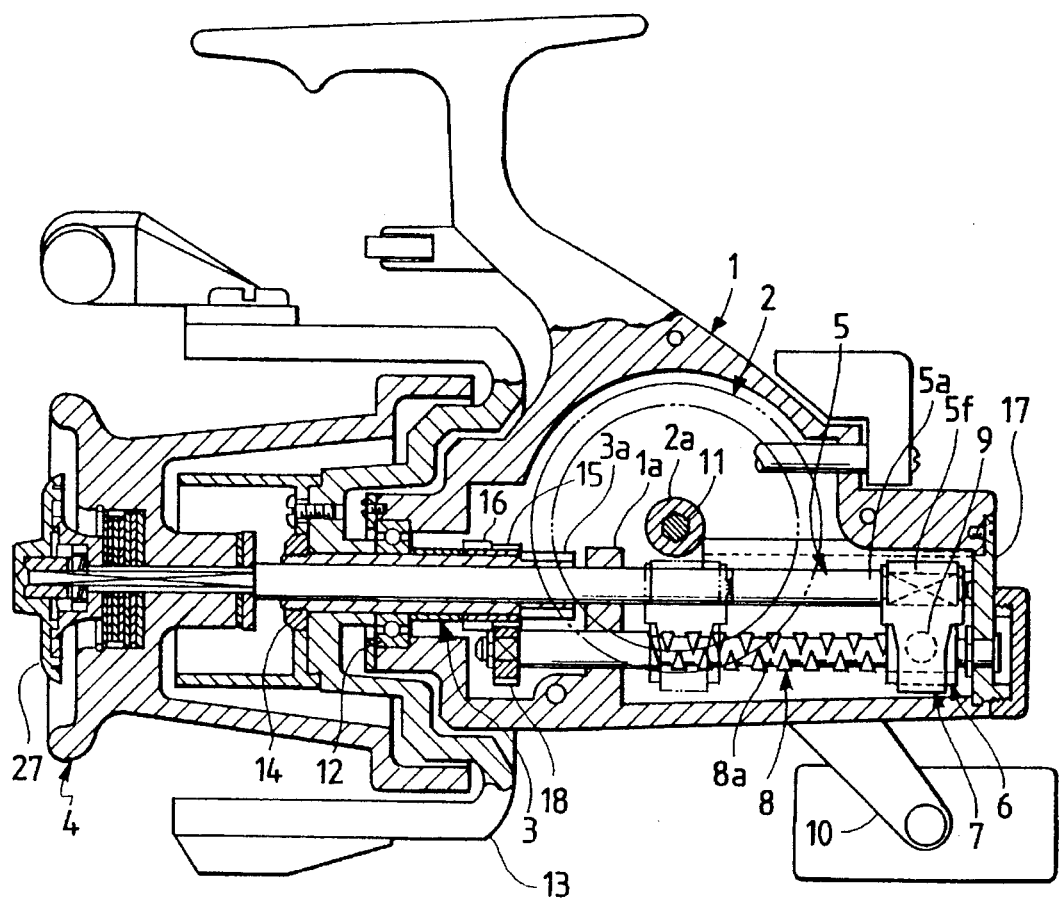
FIG. 1 is a sectional side view of the main portions of a spinning reel for fishing incorporating the present invention.
Figure 2:
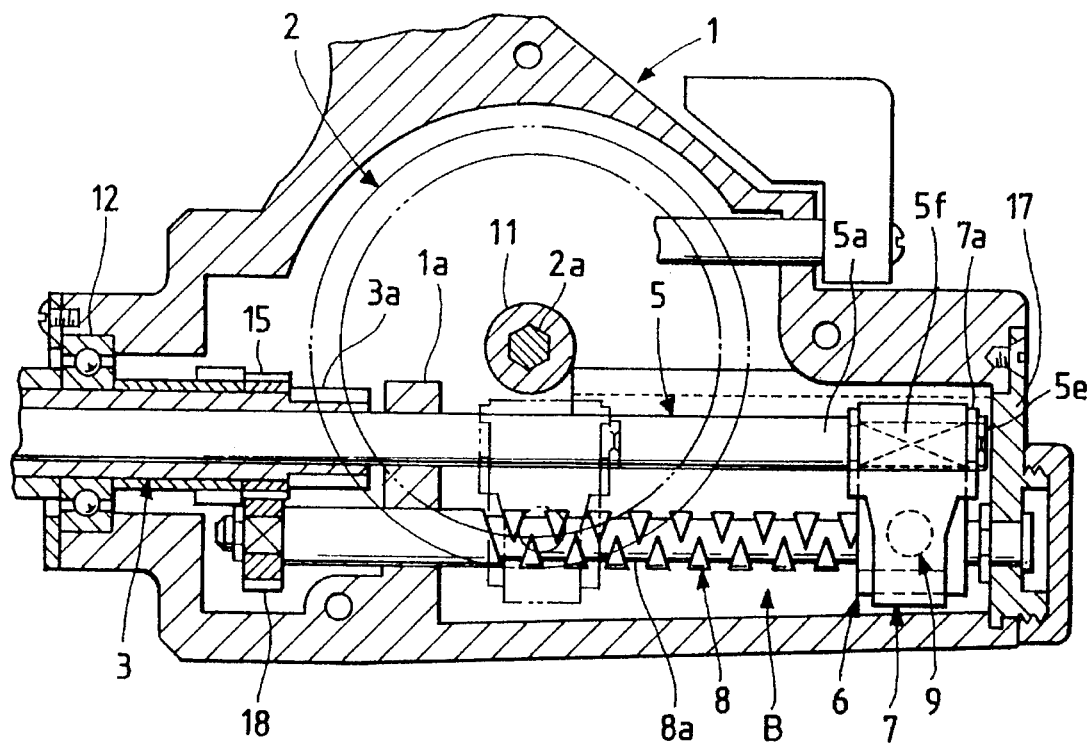
FIG. 2 is an enlarged sectional side view of the rear portion of a spinning reel for fishing incorporating the present invention.
Figure 3:
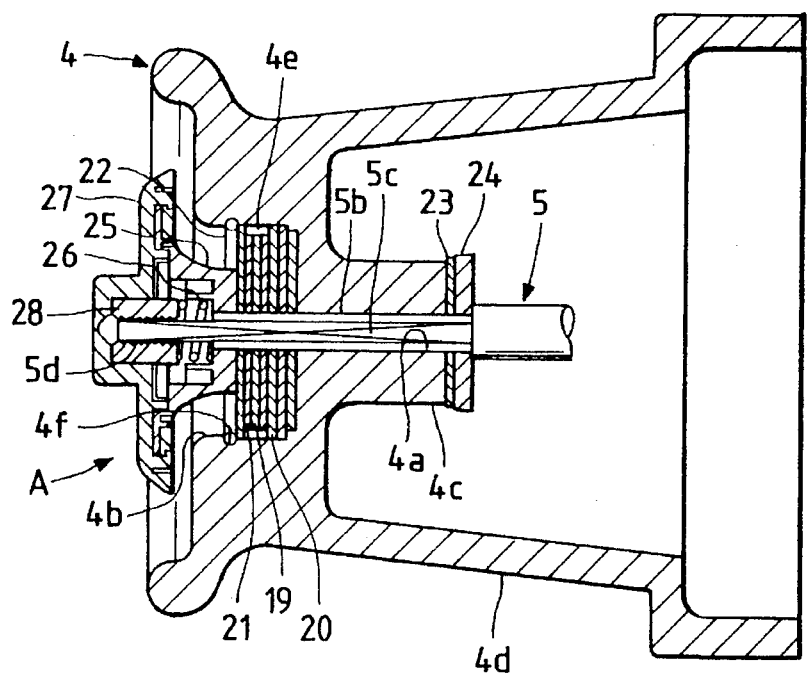
FIG. 3 is an enlarged sectional side view of a spool employed in a spinning reel for fishing.
Figure 4:
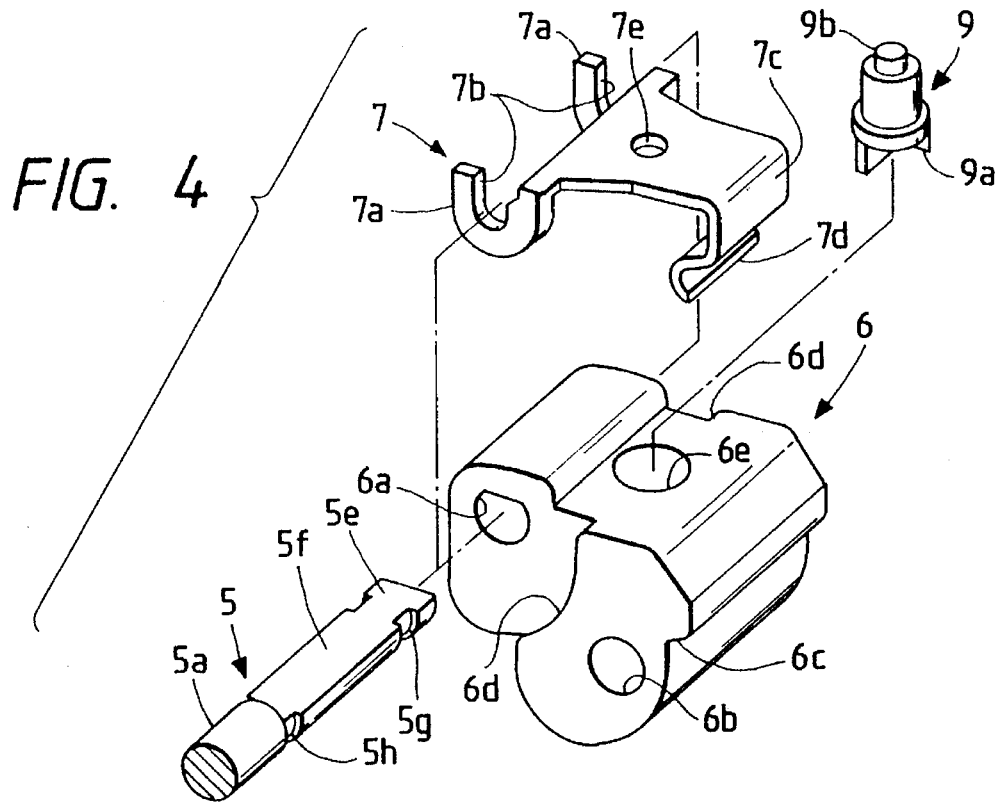
FIG. 4 is an enlarged and exploded perspective view of the slide mechanism connection according to a first embodiment of the present invention.
Figure 5A:
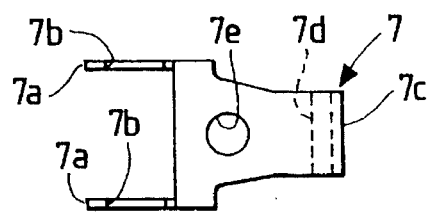
FIG. 5(a) is a plan view of the securing plate according to the first embodiment of the present invention shown in FIG. 4.
Figure 5B:
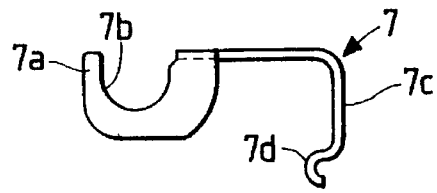
FIG. 5(b) is a side view of the securing plate according to the first embodiment of the present invention shown in FIG. 4.
Figure 6A:
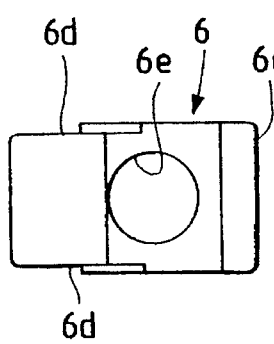
FIG. 6(a) is a plan view of the slide member according to the first embodiment of the present invention shown in FIG. 4.
Figure 6B:
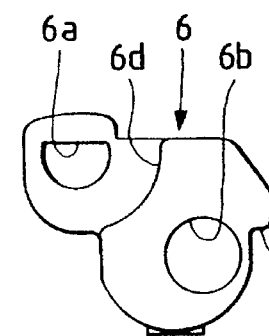
FIG. 6(b) is a front view of the slide member according to the first embodiment of the present invention shown in FIG. 4.
Figure 6C:
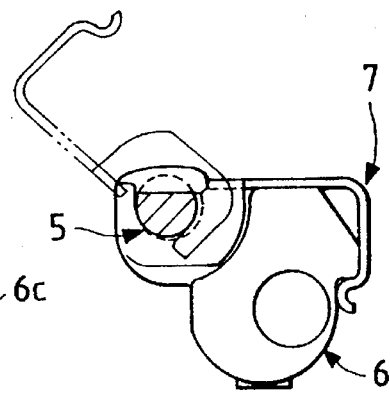
FIG. 6(c) is a front view showing how the securing plate shown in FIGS. 5(a) and 5(b) interrelates with the slide member shown in FIGS. 6(a) and 6(b).

After the spool shaft 5 is received in the slide member 6, the securing plate 7 is pivotally applied from an oblique orientation as shown by a two-dot chained line in FIG. 6(c). In particular, the pair of support portions 7a, 7a are accommodated by the pair of indentations 6d, 6d and one engaging opening 7b, 7b is received in each of the grooves 5g and 5h. The securing plate 7 is then pivoted (clockwise as shown in FIG. 6(c) to the position shown in solid lines) to bring the securing portion 7d into engagement with the securing feature 6c, thereby preventing separation of the securing plate 7 from the slide member 6. Accordingly, the spool shaft 5 is securely retained within the slide member 6.

Consequently, the securing plate 7 is simply mounted without using a screw or the like, thereby easing the assembly operation. Further, the securing plate 7 prevents inadvertent separation of the engaging member 9 from the slide member 6, the engaging member 9 being otherwise simply dropped into the blind hole 6e. The present invention both reduces the number of parts, as well as facilitates incorporating the parts, thereby simplifying assembly of a spinning reel for fishing.

Further, because the indentations 6d, 6d are formed in the slide member 6, the pair of support portions 7a, 7a are prevented from interfering with, and possibly becoming hitched on, a traverse cam groove 8a of the traverse cam shaft 8. The indentations 6d, 6d also assist in preventing movement of the securing plate 7 transverse to the axes of the spool shaft 5 and the traverse cam shaft 8, thereby more securely maintaining engagement between the securing plate 7 and the slide member 6.

Operation of the aforementioned spinning reel for fishing is as follows: Upon rotation of the handle 10, the drive gear 2 is rotated, thereby rotating the rotary shaft cylinder 3 via the pinion 3a, such that the rotor 13 is also rotated. The traverse cam shaft 8 is concurrently rotated via the linking gear 15 and small gear 18 such that the slide member 6 and spool shaft 5 are reciprocated back and forth.

A tensile force applied to a fishing line (not shown) wound on the spool 4 causes the spool 4 to be rotated against a drag brake force which is previously set by the knob 27.

FIGS. 7(a) and 7(b) show a modified securing plate 7' in which the orientation of engaging openings 7'b, 7'b are canted toward, rather than projecting perpendicular with respect to, the securing portion 7d. Further, whereas the support portions 7a, 7a penetrate an imaginary plane extending between the axes of the spool shaft 5 and traverse cam shaft 8, support portions 7'a, 7'a curl around the axis of the spool shaft 5, without penetrating the same imaginary plane. Generally, the securing plate 7' provides more substantial engagement between the engaging openings 7b, 7b with the grooves 5g and 5h, whereas the securing plate 7' requires fewer manipulations during installation.

According to the second embodiment of the present invention as shown in FIGS. 8 and 9, a modified slide member 6' is formed in a generally elongated box shape. Similar to the preceding embodiment, the slide member 6' includes a non-circular through hole 6a which receives the tip portion 5e, a circular through hole 6b into which the traverse cam shaft 8 passes, and a blind hole 6e in which the engaging member 9 is fitted. The slide member 6' also includes a projection 6f on an axial facing side surface, and a butting portion 6g at the longitudinal end portion distal from the non-circular through hole 6a.

The side of the butting portion 6g confronting a securing plate 7" may be undercut so as to form an inclined surface.

The securing plate 7" which is formed out of sheet material that can be elastically deformed, includes a pair of support portions 7a, 7a. One engaging opening 7b, 7b is formed in each of the support portions 7a, 7a. A pair of elastic portions 7g, 7g are provided on the securing plate 7", distal with respect to the support portions 7a, 7a, and a securing portion 7d for engaging the projection 6f depends from one of the pair of elastic portions 7g, 7g.

Similar to the aforementioned first embodiment, the tip portion 5e is received in the non-circular through hole 6a, and the traverse cam shaft 8 passes through the circular through hole 5b. Subsequently, the slide member 6' is held between the two support portions 7a, 7a of the securing plate 7" with the two engaging openings 7b, 7b each engaging one of the grooves 5g and 5h. The securing portion 7d is thereafter pivoted about the axis of the spool shaft 5 to engage the projection 6f, thereby preventing the spool shaft 5 from being separated relative to the slide member 6'.

According to the third embodiment of the present invention as shown in FIGS. 10 and 11, there is employed a slide mechanism C of an eccentric cam type. A pin 30 provided on a slide member 6" is connected by a connecting plate 29 to a cam 2b eccentrically provided on a drive gear 2.

The slide member 6" includes a non-circular through hole 6a into which is inserted the tip portion 5e of the spool shaft 5, and a circular through hole 6b in which a guide 31 slides. A securing feature 6c is also disposed on a side surface parallel to the axes of the spool shaft 5 and guide 31. The pin 30 for connection with the connecting plate 29 extends perpendicularly from a surface of the slide member 6" which is mutually parallel to both axes of the spool shaft 5 and guide 31.

The securing plate 7" is generally substantially similar in configuration and installation to the securing plate 7 described as the first embodiment of the present invention.

Due to the fact that the present invention is structured as described above, spinning reels for fishing in which the invention is incorporated provide several advantages: the securing plate can be simply mounted to the slide member without using a screw or the like, thereby improving the speed and ease of assembly; the number of parts required is reduced; and, the present invention can be incorporated into existing designs for spinning reels used in fishing.

What is claimed is:

1. A connecting structure for spinning reels used in fishing, the spinning reel including an axially reciprocal spool and rotatable rotor, axial reciprocation of the spool and rotation of the rotor occurring concurrently upon rotation of a handle such that a fishline to be wound around the spool is evenly distributed along an axial length of the spool; the connecting structure comprising:

a slide member including a non-circular through hole penetrating said slide, and a circular through hole having a traverse cam shaft passing therethrough, wherein rotation of said traverse cam shaft causes translation of said slide member;

a spool shaft supported for axial reciprocation with respect to a reel main body, said spool shaft including rotation prevention means for precluding rotation of said spool shaft with respect to said slide member, said rotation prevention means cooperatively engages said non-circular through-hole, said spool shaft further including at least one groove at least partially circumscribing said spool shaft;

a securing plate retained on said slide member by an elastic portion provided on said securing plate, said securing plate including at least one engaging opening, each said at least one engaging opening cooperatively engaging one said at least groove, wherein said elastic portion elastically deforms to engage said slide member thereby retaining said securing plate on said slide member;

wherein cooperative engagement between said at least one groove and said at least one engaging opening prevents displacement of said spool shaft relative to said slide member along a longitudinal axis of said spool shaft and said securing plate is secured to said slide member by cooperative engagement of said elastic portion with a stepped ridge provided on said slide member.

2. The connecting structure according to claim 1, further comprising:

a pair of said grooves at least partially circumscribing said spool shaft, said grooves being axially separated with respect to one another along said spool shaft, and said rotation prevention means being interposed between said grooves along said longitudinal axis.

3. The connecting structure according to claim 2, further comprising:

a pair of said engaging openings, said engaging openings being positioned on opposite sides of said slide member.

4. The connecting structure according to claim 3, wherein said securing portion further comprises:

a pair of support portions provided on said securing plate; wherein each of said engaging openings is formed in one of said support portions.

5. The connecting structure according to claim 4, wherein said slide member further includes:

a blind hole into which passes a pivotal engaging member;

said blind hole intersects said circular through hole and said engaging member engages said traverse cam shaft.

6. The connecting structure according to claim 5, wherein said support portions penetrate an imaginary plane extending between said longitudinal axis of said spool shaft and a longitudinal axis of said traverse cam shaft.

7. The connecting structure according to claim 5, wherein said support portions curl around an axis of said spool shaft without penetrating an imaginary plane extending between said longitudinal axis of said spool shaft and longitudinal axis of said traverse cam shaft.

8. The connecting structure according to claim 5, wherein said securing plate at least partially overlies said blind hole and abuts said engaging member to retain said engaging member within said blind hole and to bias said engaging member against said traverse cam shaft.

9. The connecting structure according to claim 1, further comprising:

guide means for guiding translation of said slide member within said reel main body, said guide means engaging said cam traverse shaft; and drive means for driving said slide member in translation, said drive means comprises a rotary member which rotates said traverse cam shaft to thereby drive said slide member in translation through said guide means.

10. The connecting structure according to claim 1, wherein said elastic deformation of said securing plate occurs in a substantially radial direction with respect to said spool shaft.

11. The connecting structure according to claim 1, wherein said elastic deformation of said securing plate occurs in a substantially axial direction with respect to said spool shaft.

12. A connecting structure for spinning reels used in fishing, the spinning reel including an axially reciprocal spool and a rotatable rotor, axial reciprocation of the spool and rotation of the rotor occurring concurrently upon rotation of a handle such that a fishline to be wound around the spool is evenly distributed along an axial length of the spool; the connecting structure comprising:

a slide member including a non-circular through hole penetrating said slide, a circular through hole having a traverse cam shaft passing therethrough, and a blind hole intersecting said circular through hole, wherein a pivotal engaging member passes into said blind hole to engage the traverse cam shaft, and a rotation of said traverse cam shaft causing reciprocation of said slide member;

spool shaft supported for axial reciprocation with respect to a reel main body, said spool shaft including rotation prevention means for precluding rotation of said spool shaft with respect to said slide member, said rotation prevention means cooperatively engages said non-circular through hole, said spool shaft further including at least one groove at least partially circumscribing said spool shaft, and;

a securing plate retained on said slide member comprising an elastic portion provided on said securing plate and at least one engaging opening, each said at least one engaging opening cooperatively engaging one said at least groove to secure said slide member to said spool shaft, said elastic portion securing said securing plate onto said slide plate;

wherein cooperative engagement between said at least one groove and at least one engaging opening prevents displacement of said spool shaft relative to said slide member along a longitudinal axis of said spool, and said securing plate is secured to said slide member by cooperative engagement of said elastic portion with a stepped ridge provided on said slide member.

* * * * *